(No Model.)

G. H. STRONG.
ENGRAVER'S CHUCK.

No. 270,615. Patented Jan. 16, 1883.

Witnesses:

Inventor:
George H. Strong

UNITED STATES PATENT OFFICE.

GEORGE H. STRONG, OF CHICAGO, ILLINOIS.

ENGRAVER'S CHUCK.

SPECIFICATION forming part of Letters Patent No. 270,615, dated January 16, 1883.

Application filed April 8, 1882. (No model.)

*To all whom it may concern:*

Be it known that I, GEORGE H. STRONG, a citizen of the United States, residing at Chicago, in the county of Cook and State of Illinois, have invented new and useful Improvements in an Engraver's Chuck, which is reversible and revolving. Said invention has never been patented to myself or to any other person or persons, with my consent or knowledge, in any foreign country.

My invention relates to improvements in a chuck for the use of engravers; and the objects of my improvements are, first, to so construct a chuck that engravers may fasten and hold firmly small articles while engraving the same—namely, spoons, forks, jewelry, &c.; secondly, to so construct a chuck that both sides of the same may be easily and conveniently used for holding different articles while being engraved. I attain these objects by the mechanism illustrated in the accompanying drawings, in which—

Figure 1:
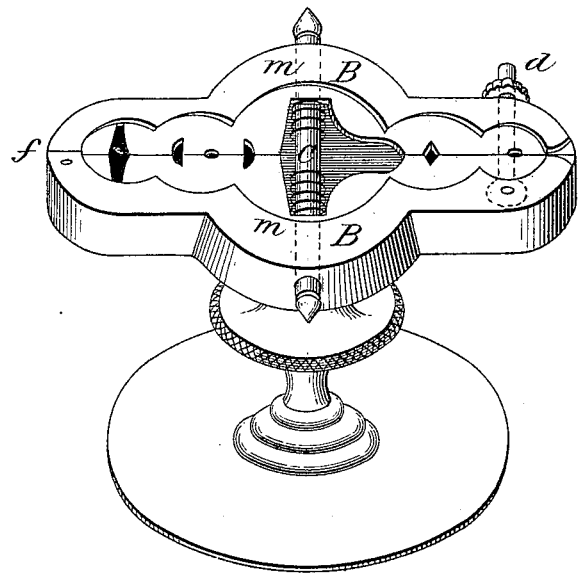
Figure 3:
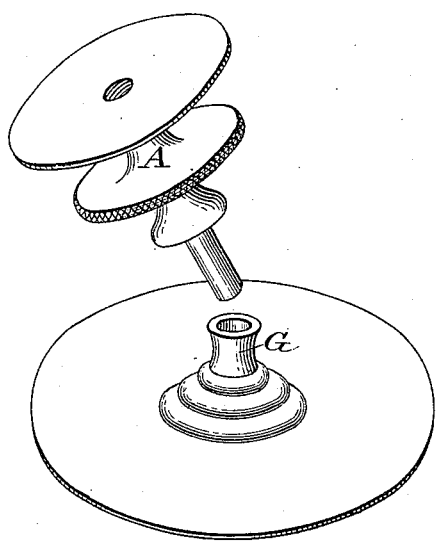
Figure 2:
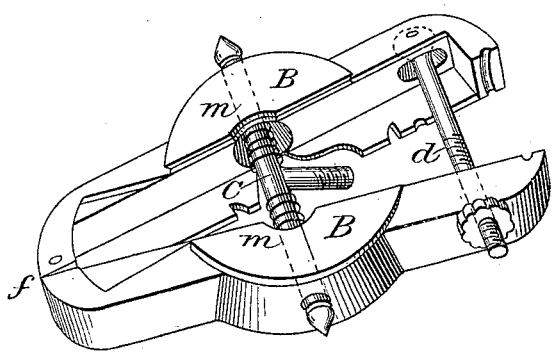
Figure 4:
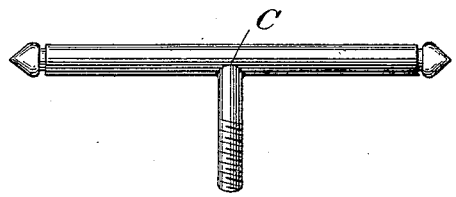

Figure 1 represents a perspective view of the chuck with the jaws closed. Fig. 2 represents the reverse side of the chuck with the jaws open. Fig. 3 represents the stand with its two parts separated. Fig. 4 represents the T-shaped rod for holding the chuck to the stand. The same are also represented by letters, as follows:

B B is the chuck. C is the rod or T, running across and through the jaws of the chuck B B to fasten and hold the chuck to the stand. A and G are the parts of the stand. $d$ is the bolt and nut. $m$ $m$ are the spiral springs. The chuck B B, the T-shaped rod C, the stand A G, the bolt and nut $d$, and the spiral springs $m$ $m$ constitute the whole tool.

In manufacturing this article I use cast brass, iron, lead, or other composition. B B is cast in two sections, and fastened together at one end by a hinge, (represented by $f$ in the accompanying drawings.) The arms of the T-shaped rod C are round, and run through conical-shaped holes provided in the center of the jaws of the chuck B B, and have a bearing on either side of B B, so that the chuck may be reversed and either side used for holding articles. Said rod is provided with a screw on the central projection, fitted to a screw-hole in the upper part of the stand A, for the purpose of drawing down and holding firmly the chuck to the upper part of the stand A. Said rod is provided with spiral springs on either side of the central part, adjusted to the horizontal parts or arms for the purpose of keeping said central part always at the same distance from each of the jaws of the chuck B B, and for opening the jaws when the same are being adjusted for use.

A is the upper part of the stand, upon which the chuck is mounted for use, and at its top is provided with a screw-hole for the central part of the rod C, which is provided with a screw, as aforesaid, to screw into it, and at its bottom has a pinion, which fits into a socket in the lower part of the stand G, running from the top of said lower part through the same, and secured at the bottom loosely, so that the part A of the stand may revolve upon the part G, and yet the parts be kept together.

G is the lower part of the stand, and has a hole running through it from the top to receive the pinion at the lower end of the upper part of the stand A. The distance apart of the jaws of the chuck is regulated by the screw bolt and nut $d$.

One side of the chuck is for holding coins and other circular articles, and has circular disks sunk in its surface for the purpose, and on the other side are two half-circular pieces projecting above the surface of the chuck, and having grooves on the inner straight edges for holding the handles of spoons, forks, &c., above the surface of the chuck while the same are being engraved.

The indentations, grooves, &c., in the jaws of the chuck are for inserting such articles as it may be desired to hold while engraving the same, substantially as set forth.

I do not claim the whole combination of this article; but

What I do claim, and ask Letters Patent for, is—

1. In a reversible engraver's chuck, the combination of the jaws of the chuck B B, the rod C, provided with the springs $m$ $m$, and the adjusting-rod $d$, substantially as described.

2. In a reversible engraver's chuck, the combination of the jaws of the chuck B B, the rod C, provided with the springs $m$ $m$, the adjusting-rod $d$, and the separable standard A G, substantially as described.

GEORGE H. STRONG.

Witnesses:
JOHN M. H. BURGETT,
WILLIAM L. DE LACEY.